(12) United States Patent
Davis

(10) Patent No.: US 11,477,084 B2
(45) Date of Patent: *Oct. 18, 2022

(54) METHOD AND SYSTEM FOR NODE DISCOVERY AND SELF-HEALING OF BLOCKCHAIN NETWORKS

(71) Applicant: MASTERCARD INTERNATIONAL INCORPORATED, Purchase, NY (US)

(72) Inventor: Steven C. Davis, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,112

(22) Filed: Sep. 11, 2019

(65) Prior Publication Data

US 2020/0007393 A1 Jan. 2, 2020

Related U.S. Application Data

(63) Continuation of application No. 15/211,076, filed on Jul. 15, 2016, now Pat. No. 10,454,765.

(51) Int. Cl.
*H04L 41/08* (2022.01)
*H04L 69/165* (2022.01)
(Continued)

(52) U.S. Cl.
CPC ...... *H04L 41/0886* (2013.01); *H04L 41/0836* (2013.01); *H04L 47/286* (2013.01);
(Continued)

(58) Field of Classification Search
CPC ....... G06Q 20/065; H04L 43/10; H04L 45/26; H04L 67/104; H04L 45/02
See application file for complete search history.

(56) References Cited

U.S. PATENT DOCUMENTS 4,816,702 A 3/1989 Salina et al.
6,760,309 B1 7/2004 Rochberger et al.
(Continued)

FOREIGN PATENT DOCUMENTS

CN 105051726 A 11/2015
CN 105719185 A 6/2016
(Continued)

OTHER PUBLICATIONS

Office Action (The First Office Action) dated Oct. 28, 2020, by the State Intellectual Property Office of People's Republic of China in corresponding Chinese Patent Application No. 201780042699.X and an English Translation of the Office Action. (28 pages).

(Continued)

*Primary Examiner* — Tom Y Chang
(74) *Attorney, Agent, or Firm* — Panitch Schwarze Belisario & Nadel LLP

(57) ABSTRACT

A method for automatic configuration of a communication network includes: generating a request message, the request message including a communication address associated; transmitting the generated request message as a broadcast message to a plurality of computing devices using a predefined user datagram protocol (UDP) port, the message being broadcast with a predetermined time to live; receiving agreement messages from computing devices transmitted by the respective computing device using the predefined UDP port, each agreement message including a communication address associated with the respective computing device and a specified transmission control protocol (TCP) port; identifying at least one of the one or more agreement messages for establishment of communication; and establishing a communication connection to the computing device associated with each identified agreement message using the specific TCP port.

10 Claims, 8 Drawing Sheets

(51) Int. Cl.
*H04L 67/52* (2022.01)
*H04L 41/0823* (2022.01)
*H04L 47/28* (2022.01)
*H04L 69/16* (2022.01)
*H04L 67/104* (2022.01)
*H04L 45/00* (2022.01)
*H04L 45/02* (2022.01)
*H04L 43/10* (2022.01)

(52) U.S. Cl.
CPC .............. *H04L 67/52* (2022.05); *H04L 69/16* (2013.01); *H04L 69/165* (2013.01); *H04L 43/10* (2013.01); *H04L 45/02* (2013.01); *H04L 45/26* (2013.01); *H04L 67/104* (2013.01)

(56) References Cited

U.S. PATENT DOCUMENTS

| | | | |
|---|---|---|---|
| 2006/0173967 A1* | 8/2006 | Jennings, III | H04L 67/107 709/208 |
| 2007/0258389 A1* | 11/2007 | Suzuki | H04L 67/104 370/254 |
| 2008/0285520 A1* | 11/2008 | Forte | H04W 36/0016 370/331 |
| 2009/0113034 A1 | 4/2009 | Krishnappa et al. | |
| 2013/0059656 A1 | 3/2013 | Kim et al. | |
| 2013/0191434 A1* | 7/2013 | Smith | G06F 9/542 709/201 |
| 2015/0347538 A1 | 12/2015 | Ohno | |
| 2016/0203522 A1* | 7/2016 | Shiffert | G06Q 30/0267 705/14.58 |
| 2017/0243212 A1 | 8/2017 | Castinado et al. | |
| 2017/0372417 A1* | 12/2017 | Gaddam | G06Q 20/06 |

FOREIGN PATENT DOCUMENTS

| | | |
|---|---|---|
| EP | 2 153 623 A2 | 2/2010 |
| EP | 2408173 A1 | 1/2012 |
| WO | 2008/049870 A2 | 5/2008 |

OTHER PUBLICATIONS

Office Action (First Examination Report) dated Jun. 8, 2020, by the Intellectual Property India in corresponding India Patent Application No. 201817006257 and an English Translation of the Office Action. (7 pages).

The extended European Search Report dated Nov. 25, 2020, by the European Patent Office in corresponding European Patent Application No. 20191630.1-1215. (13 pages).

Office Action (The Second Office Action) dated May 19, 2021, by the State Intellectual Property Office of People's Republic of China in corresponding Chinese Patent Application No. 201780042699.X and an English Translation of the Office Action. (24 pages).

Notification to Grant Patent Right for Invention dated Oct. 18, 2021, by the China National Intellectual Property Administration in corresponding Chinese Patent Application No. 201780042699.X and an English Translation of the Notification to Grant. (4 pages).

Notification of Transmittal of the International Search Report and the Written Opinion of the International Searching Authority dated Sep. 21, 2017 in International Application No. PCT/US2017/036240 (14 pages).

\* cited by examiner

METHOD AND SYSTEM FOR NODE DISCOVERY AND SELF-HEALING OF BLOCKCHAIN NETWORKS

FIELD

The present disclosure relates to the automatic configuration of a communication network, specifically the discovery and self-configuration and self-healing of communication networks, including blockchain networks, that are partition-resistant via the use of multiple connection times and varying times to live.

BACKGROUND

Communication networks are often established for a wide variety of different reasons. Some communication networks may be small, local area networks used for connecting devices in a home or business, whereas other communication networks may be large networks of interconnected systems and devices that span cities, countries, or the world. In some types of networks, such as blockchain networks, a new device or system that wants to connect into the network must first connect to one of a handful of previously identified hosting systems. These previously identified systems are often either hard-coded into the connection program or their connection information is manually entered by an operator when the connection is being established.

In either instance, the connection of a device or system into the communication network requires prior knowledge of specific communication addresses. In such cases, if a new device or system wants to participate in the communication network, such information must first be obtained. As a result, automatic configuration of such networks is impossible without first establishing the hosting systems, obtaining their communication information, and hard-coding the connection programs to utilize the connection information. Furthermore, any changes to the connection information of the hosting systems after the communication network is established would result in a node being unable to reconnect if the connection is lost, and require that node to have their connection program updated with the changed connection information. For communication networks that may span thousands or millions of computing devices over great distances, such detailed configuration that can require constant updating may be inefficient and unreliable.

Thus, there is a need for a technological solution to provide for efficient automatic configuration and self-healing of communication networks that do not require the use of hard-coded or manually entered communication addresses, where a device or system may be automatically connected into the network without the use of and previously identified communication addresses.

SUMMARY

The present disclosure provides a description of systems and methods for the automatic configuration of a communication network and configuration of a partition-resistant communication network.

A method for automatic configuration of a communication network includes: generating, by a generation module of a processing server, a request message, wherein the request message includes at least a communication address associated with the processing server; electronically transmitting, by a transmitting device of the processing server, the generated request message as a broadcast message to a plurality of computing devices using a predefined user datagram protocol (UDP) port, wherein the broadcast message is transmitted with a predetermined time to live; receiving, by a receiving device of the processing server, one or more agreement messages, wherein each agreement message is received from one of the plurality of computing devices, is transmitted by the respective computing device using the predefined UDP port, and includes at least a communication address associated with the respective computing device and a specified transmission control protocol (TCP) port; identifying, by a data identification module of the processing server, at least one of the one or more agreement messages for establishment of communication; and establishing, by a communications module of the processing server, a communication connection to the computing device associated with each of the at least one identified agreement messages using the specific TCP port included in the respective agreement message.

A method for configuration of a partition-resistant communication network includes: generating, by a generation module of a processing server, a request message, wherein the request message includes at least a communication address associated with the processing server; electronically transmitting, by a transmitting device of the processing server, the generated request message to a plurality of computing devices; receiving, by a receiving device of the processing server, a set of agreement messages, wherein each agreement message is received from one of the plurality of computing devices and includes at least a communication address associated with the respective computing device and a specified transmission control protocol (TCP) port; identifying, by a data identification module of the processing server, one distant computing device and at least one local computing device of the plurality of computing devices where from each an agreement message is received, wherein the distant computing device has a greater geographic distance to the processing server than each of the at least one local computing devices; and establishing, by a communications module of the processing server, a communication connection to the distant computing device and each of the at least one local computing devices using the specific TCP port included in the respective agreement message.

A system for automatic configuration of a communication network includes: a generation module of a processing server configured to generate a request message, wherein the request message includes at least a communication address associated with the processing server; a transmitting device of the processing server configured to electronically transmit the generated request message as a broadcast message to a plurality of computing devices using a predefined user datagram protocol (UDP) port, wherein the broadcast message is transmitted with a predetermined time to live; a receiving device of the processing server configured to receive one or more agreement messages, wherein each agreement message is received from one of the plurality of computing devices, is transmitted by the respective computing device using the predefined UDP port, and includes at least a communication address associated with the respective computing device and a specified transmission control protocol (TCP) port; a data identification module of the processing server configured to identify at least one of the one or more agreement messages for establishment of communication; and a communications module of the processing server configured to establish a communication connection to the computing device associated with each of the at least one identified agreement messages using the specific TCP port included in the respective agreement message.

A system for configuration of a partition-resistant communication network includes: a generation module of a processing server configured to generate a request message, wherein the request message includes at least a communication address associated with the processing server; a transmitting device of the processing server configured to electronically transmit the generated request message to a plurality of computing devices; a receiving device of the processing server configured to receive a set of agreement messages, wherein each agreement message is received from one of the plurality of computing devices and includes at least a communication address associated with the respective computing device and a specified transmission control protocol (TCP) port; a data identification module of the processing server configured to identify one distant computing device and at least one local computing device of the plurality of computing devices where from each an agreement message is received, wherein the distant computing device has a greater geographic distance to the processing server than each of the at least one local computing devices; and a communications module of the processing server configured to establish a communication connection to the distant computing device and each of the at least one local computing devices using the specific TCP port included in the respective agreement message.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a permissionless, distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency. In some cases, participation in a blockchain (e.g., as a node submitting and/or confirming transactions) may be permissionless (e.g., not moderated or restricted). In other cases, a blockchain may be a permissioned blockchain where only authorized computing devices may operate as nodes, where a level of participation may be based on permissions associated therewith.

Figure 1:
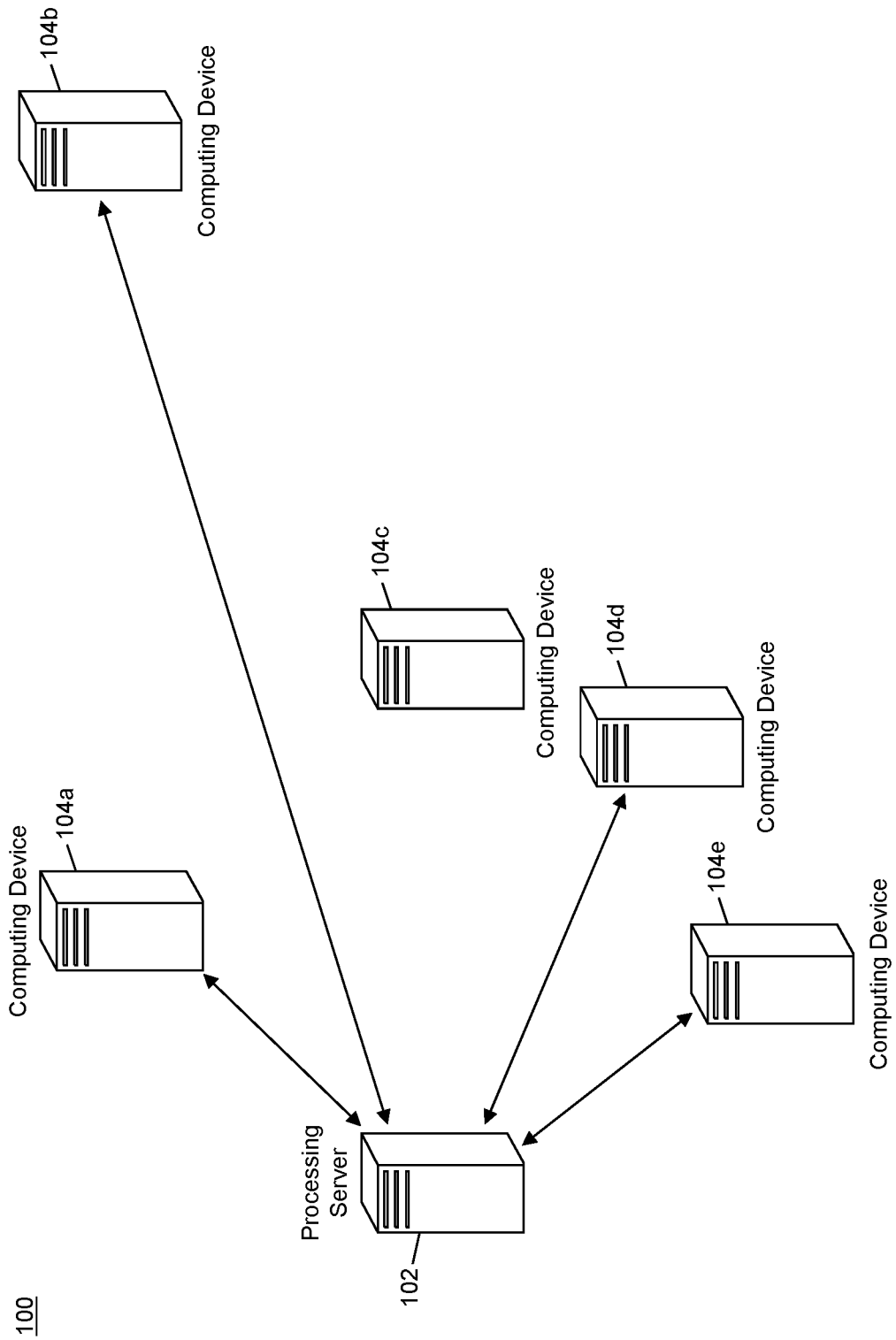
FIG. 1 is a block diagram illustrating a high level system architecture for the automatic configuration of a partition-resistant communication network in accordance with exemplary embodiments.

System for Automatic Configuration of Partition-Resistant Communication Networks FIG. 1 illustrates a system 100 for the automatic configuration of a communication network, including the automatic configuration of a partition-resistant communication network, through the use of broadcast request messages via predefined communication ports.

The system 100 may include a processing server 102. The processing server 102, discussed in more detail below, may be configured to automatically configure itself for participation in a communication network. In some embodiments, the automatic configuration performed by the processing server 102 may increase the resistance of the communication network against network partitions that may occur as a result of loss of communications between other nodes in the communication network.

The system 100 may also include a plurality of computing devices 104, illustrated in FIG. 1 as computing devices 104a, 104b, 104c, 104d, and 104e. Each computing device 104 may be a node in a communication network that is automatically configured using the methods discussed herein. A computing device 104 may be any type of computing device suitable for performing the functions discussed herein, such as a desktop computer, laptop computer, notebook computer, tablet computer, application-specific integrated-circuit, cellular phone, smart phone, smart television, smart watch, wearable computing device, implantable computing device, etc. Communication networks that may be suitable for automatic configuration using the methods discussed herein may include, for example, blockchain networks, local area networks, wireless area networks, etc.

The processing server 102 may be configured to automatically connect with one or more of the computing devices 104 using the methods discussed herein. The processing server 102 may generate a request message. The request message may include at least a communication address associated with the processing server 102. The communication address may be an internet protocol address, media access control address, or other type of address that may be used in identification of the processing server 102 for the establishing of communication in the communication network. In instances where the communication network may be a blockchain network, the communication address may be a blockchain network address, which may be derived using a public key of a key pair associated with the processing server 102, which may be derived using one or more algorithms associated with the blockchain network.

In some instances, the request message may also include additional information. The additional information may include, for example, a timestamp, a network identifier, one or more service indicators, and a host address. The timestamp may be a representation of the time at which the request message is generated, which may be represented in any suitable format (e.g., in seconds since the start of the UNIX epoch, a predefined DateTime format, etc.). The network identifier may be an identification value associated with the communication network to which the processing server 102 is wanting to join, such as an identifier associated with a blockchain network. Service indicators may be identification value that indicate a level of service of the processing server 102 in the communication network. For example, if the communication network is a blockchain network for a permissioned blockchain, the service indicators may indicate the types of nodes the processing server 102 may be configured to operate as (e.g., a client node, audit node, member node, etc.). The host address may be a secondary communication address for the processing server 102, such as in instances where the request message may include a different communication address due to the communication configuration of the processing server 102, such as communications made from the processing server 102 pass through a router that includes a different communication address in the request message. In embodiments where the communication network is a blockchain network, the additional information may also include data associated with the corresponding blockchain, such as a block height, number of blocks, hash value of the most recently added block, etc.

The processing server 102 may be configured to broadcast the generated request message via a predefined user datagram protocol (UDP) port. In some embodiments, the processing server 102 may broadcast the request message using a multicast technique. The UDP port may be predefined by the communication network, such that any node in the communication network (e.g., computing device 104), or wishing to join the communication network (e.g., the processing server 102), may be informed of the UDP port using any suitable method. Each of the computing devices 104 in the communication network may listen on the predefined UDP port for the broadcast request message.

A computing device 104 may receive the request message via the predefined UDP port. The computing device 104 may then determine if they want to establish a connection to the processing server 102. Such a determination may be made using any suitable criteria, such as, for example, a predefined maximum number of connections and the existing number of connections by the computing device 104 in the communication network. For instance, a computing device 104 may already be connected to eight other nodes in the communication network, and may refrain from establishing another connection. If a computing device 104 decides, based on the determination, to connect to the processing server 102, the computing device 104 may generate an agreement message.

The agreement message may include at least a communication address associated with the computing device 104 and a transmission control protocol (TCP) port. The TCP port may be a port of the computing device 104 with which the computing device 104 may be configured to perform two-way communications with the processing server 102, if such a communication is established, as part of the communication network. In some instances, the agreement message may include a plurality of TCP ports, such as in instances where the computing device 104 may utilize more than one TCP port as part of the communication network. In cases where the communication network is a blockchain network, the communication address for the computing device 104 may be the blockchain address derived using a public key associated with the computing device 104 in the blockchain network. In some embodiments, the request message may also include additional information, such as one or more service indicators, a secondary communication address, a timestamp, a network identifier, data associated with a blockchain, etc.

The computing device 104 may then electronically transmit the agreement message back to the processing server 102 using the predefined UDP port. The processing server 102 may then receive the agreement message. The processing server 102 may receive a plurality of different agreement messages, one from each computing device 104 that is amenable to the establishing of a connection as part of the communication network. In the example illustrated in FIG. 1, the processing server 102 may receive an agreement message from computing devices 104a, 104b, 104d, and 104e. Once the processing server 102 has received an agreement message, the processing server 102 may establish a communication connection with the associated computing device 104 using one of the TCP ports indicated in the agreement message. In some embodiments, the request message broadcast by the processing server 102 may include one or more TCP ports for use by the processing server 102. In such embodiments, the agreement messages may indicate at least one of the provided TCP ports, which may be used by the processing server 102 in establishing the communications.

In some embodiments, the communication network may require a predefined number of connections for participation in the communication network. In such embodiments, the processing server 102 may establish at the least the predefined number of connections upon the receipt of the agreement messages. In cases where the processing server 102 may not receive enough agreement messages, the processing server 102 may repeat the broadcast of the request message until at least the required number of agreement messages have been received. In the example illustrated in FIG. 1, the predefined number of connections may be no higher than four, such that the connections established by the processing server 102 with the computing devices 104 is suitable for participation in the communication network.

In some embodiments, the processing server 102 may utilize a time to live value in automatically configuring its connection to the communication network. In such an embodiments, the processing server 102 may first broadcast the request message via the predefined UDP port using a first time to live value. If the processing server 102 does not receive a suitable number of agreement messages in response, the processing server 102 may repeat the broadcast of the request message using a second, higher, time to live value. The higher time to live value may result in the request message reaching a larger number of computing devices 104, which may, in turn, result in the receipt of more agreement messages. The processing server 102 may continue to rebroadcast the request message with increasingly higher time to live values until a suitable number of agreement messages is received.

In some cases, the processing server 102 may establish communication connections with computing devices 104 that return agreement messages prior to increasing the time to live. For example, the communication network may require at least four communications for participation. The processing server 102 may broadcast the request message using a first time to live, which may be replied to via agreement messages by the computing devices 104a and 104e. The processing server 102 may establish communication connections with the computing devices 104a and 104e before rebroadcasting the request message with a higher time to live. The processing server 102 may then continue to repeat the process until the predefined number of communications is established (e.g., with computing devices 104b and 104d).

In other cases, the processing server 102 may not establish communication connections until enough agreement messages for the predefined number of connections have been received. In some such cases, the processing server 102 may prioritize agreement messages based on receipt. For instance, in the above example, the processing server 102 may rebroadcast the request message with a high enough time to live to receive six different agreement messages. The processing server 102 may prioritize agreement messages received from the computing devices 104a and 104e, since they were already received when a lower time to live was used.

In some embodiments, the processing server 102 may be configured to connect to computing devices 104 in such a way as to automatically configure the communication network to be resistant to network partitioning. In such embodiments, the processing server 102 may connect to at least one computing device 104 that has a large geographic distance between itself and the processing server 102. The use of a larger geographic distance may result in a higher likelihood that communication in the communication network is maintained in instances where communication connections may be broken between nodes due to physical intervention.

For instance, in the example illustrated in FIG. 1, the processing server 102 may establish communication connections with "local" computing devices 104a, 104d, and 104e, which may be the three computing devices 104 with the closest geographic proximity to the processing server 102 that returned agreement messages to the processing server 102, but may also establish a communication connection to the "distant" computing device 104b, which may have a significantly greater geographic distance to the processing server 102. For example, the processing server 102 may be located in the United States with each of the computing devices 104a, 104c, 104d, and 104e being located in the same state, while the computing device 104b may be located in the United Kingdom. Such configurations, when used by multiple computing devices 104 in the communication network, may increase the resistance of the network to partitioning.

Determination of the geographic distance may be made using any suitable criteria. In some instances, the agreement messages returned by computing devices 104 may include geographic information, such as a geographic location in a suitable representation (e.g., latitude and longitude, zip code or postal code, city, state, country, municipality, etc.). In other instances, the processing server 102 may be configured to identify the geographic location of a computing device 104 that returned an agreement message using the communication address. For example, the processing server 102 may include a location database, discussed in more detail below, which may include a lookup table of internet protocol addresses or data included therein and corresponding geographic locations. The processing server 102 may thus identify a geographic location for a computing device 104 using the agreement message, and may determine therefrom which computing devices 104 to establish a connection to.

In some embodiments, the processing server 102 may be configured to identify a distant computing device (e.g., the computing device 104b) via the use of varying times to live. For instance, the processing server 102 may use a first time to live when broadcasting the request message, which may be responded to by the computing devices 104a, 104d, and 104e. The processing server 102 may then use a significantly higher second time to live in a rebroadcast of the request message, which may be responded to by the computing device 104b. The processing server 102 may thus infer a greater geographic distance for the computing device 104b as a result of the higher time to live. In some cases, the processing server 102 may use a series of increasing times to live, to strengthen the inference of a greater geographic distance. For example, the processing server 102 may use five different increasing times to live when rebroadcasting, and may connect to the computing device 104b as a computing device 104 that only responds to the highest time to live.

Methods and systems discussed herein may enable the automatic configuration of a communication network that does not utilize any predefined communication addresses and that may be performed without manual input of communication addresses. This may result in a more efficient establishing of a communication network that may be successful even in instances where communication addresses may regularly change. In addition, this may also increase the efficiency and effectiveness of self-healing in the communication network, as any node in the communication network may be able to automatically rejoin the network if connections are lost or automatically establish new connections if a connection is dropped. The methods and systems discussed herein may also provide greater resistance against network partitioning due to the use of communication connections to computing devices 104 (e.g., the computing device 104b) that have a greater geographic distance to the processing server 102, which, when combined with the automatic configuration, may result in a faster, yet more robust, automatically configured communication network than provided via traditional methods.

Processing Server

Figure 2:
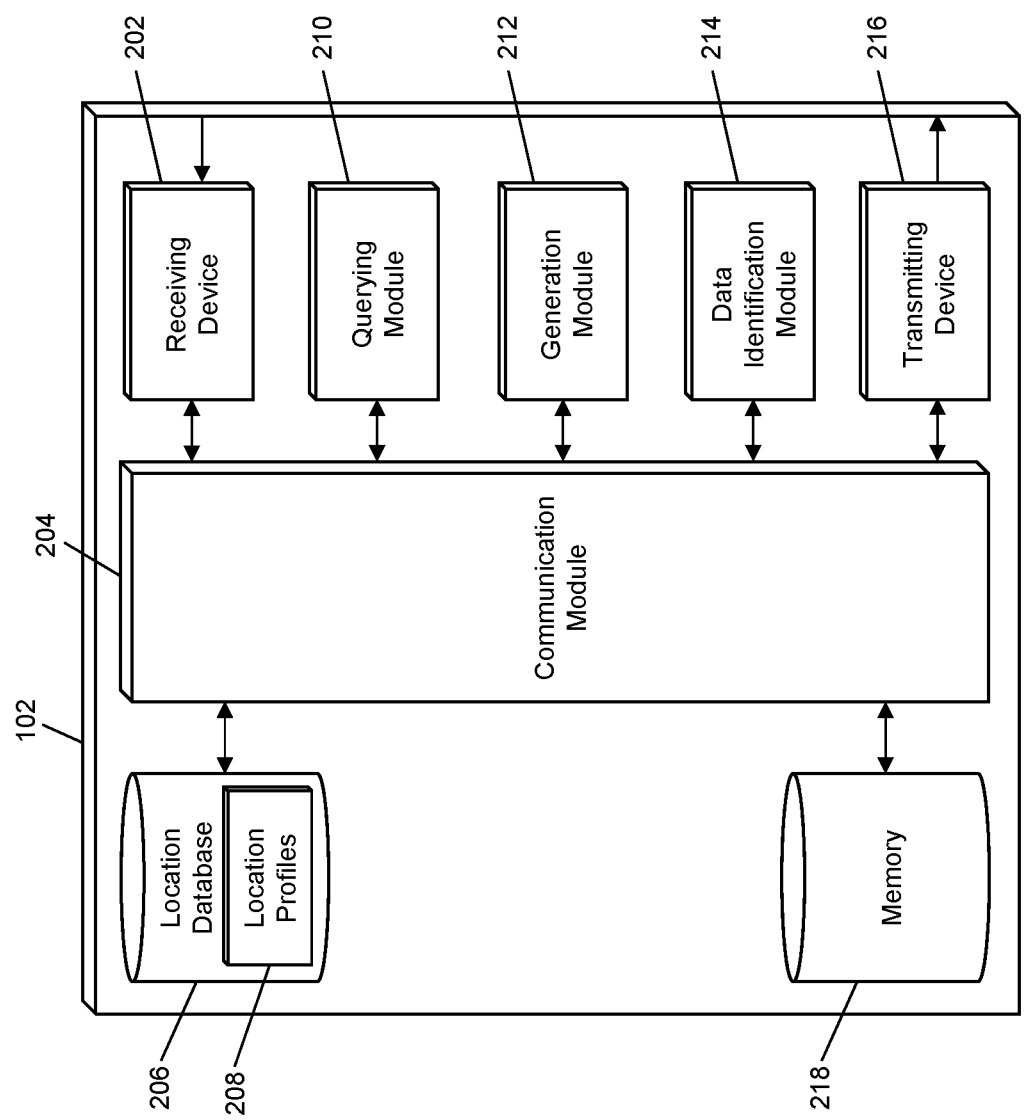
FIG. 2 is a block diagram illustrating the processing server of FIG. 1 for the automatic configuration of a partition-resistant communication network in accordance with exemplary embodiments.

FIG. 2 illustrates an embodiment of a processing server 102 of the processing system 102 in the system 100. It will be apparent to persons having skill in the relevant art that the embodiment of the processing server 102 illustrated in FIG. 2 is provided as illustration only and may not be exhaustive to all possible configurations of the processing system 102 suitable for performing the functions as discussed herein. For example, the computer system 800 illustrated in FIG. 8 and discussed in more detail below may be a suitable configuration of the processing server 102.

The processing server 102 may include a receiving device 202. The receiving device 202 may be configured to receive data over one or more networks via one or more network protocols. The receiving device 202 may be configured to receive data from computing devices 104 and other devices and systems via suitable communication networks and corresponding network protocols. In some embodiments, the receiving device 202 may be comprised of multiple devices, such as different receiving devices for receiving data over different networks, such as a first receiving device for receiving data over a local area network and a second receiving device for receiving data via a blockchain network. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 104. The data signals may be superimposed or otherwise encoded with agreement messages, which may be received via a predefined UDP port. Agreement messages may include at least one or more TCP ports and a communication address, and may also include a timestamp, network identifier, blockchain data, service indicators, additional communication addresses, etc. The receiving device 202 may also be configured to receive data signals from computing devices 104 via a TCP port using a communication connection established therewith. In embodiments where the processing server 102 may operate as a computing device 104, the receiving device 202 may be configured to receive request messages broadcast using a predefined UDP port, which may be responded to by the processing server 102 for connecting to new nodes attempting to join the communication network.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 210, generation module 212, data identification module 214, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a location database 206. The location database 206 may be configured to store a plurality of location profiles 208 using a suitable data storage format and schema. The location database 206 may be a relational database that utilizes structured query language for the storage, identification, modifying, updating, accessing, etc. of structured data sets stored therein. Each location profile 208 may be a structured data set configured to store data related to geographic locations and communication addresses. Each location profile 208 may include at least a geographic location and a communication address designator. The geographic location may be any suitable representation of a geographic location. The communication address designator may be a value included in or comprising a communication address. For instance, if the communication address is an internet protocol address, the communication address designator may be one, two, or three parts of an internet protocol version 4 or version 6 address. In some instances, a location profile 208 may include a plurality of communication addresses associated with the included geographic location, which may be identified via any suitable method.

The processing server 102 may include a querying module 210. The querying module 210 may be configured to execute queries on databases to identify information. The querying module 210 may receive one or more data values or query strings, and may execute a query string based thereon on an indicated database, such as the location database 206, to identify information stored therein. The querying module 210 may then output the identified information to an appropriate engine or module of the processing server 102 as necessary. The querying module 210 may, for example, execute a query on the location database 206 to identify a location profile 208 associated with a communication address included in a received agreement message to determine a geographic distance to the computing device 104 associated therewith, for use in establishing connections to the communication network.

The processing server 102 may also include a generation module 212. The generation module 212 may be configured to generate request and agreement messages for use in performing the functions of the processing server 102 as discussed herein. The generation module 212 may receive a request, may generate a message based on that request, and may output the generated message to another module or engine of the processing server 102. For example, the generation module 212 may be instructed to generate a request message. The request message may include at least a communication address associated with the processing server 102, and may also include additional data including one or more TCP ports, a network identifier, a timestamp, blockchain data, one or more service indicators, etc. In embodiments where the communication network may be a blockchain network, the generation module 212 may also be configured to generate a blockchain address. The blockchain address may be generated using a public key of a key pair that may be associated with the processing server 102, such as may be stored in the memory 218, discussed below. In some cases, the blockchain address may be generated using one or more specific algorithms, such as may be associated with the blockchain network. In some cases, the generation module 212 may be configured to generate an agreement message, such as in cases where the processing server 102 acts as a computing device 104 to further nodes trying to join the communication network.

The processing server 102 may also include a data identification module 214. The data identification module 214 may be configured to receive one or more data values as input, may identify data based on the input data values, and may output the identified data to another module or engine of the processing server 102. The data identification module 214 may, for example, be configured to identify one or more computing devices 104 with which to establish a connection. Computing devices 104 may be identified based on received agreement messages, and may be further based on prioritization and/or geographic distance. For instance, the data identification module 214 may be configured to identify a plurality of local computing devices 104 and at least one distance computing device 104 based on geographic locations and/or times to live used in prompting corresponding agreement messages. The data identification module 214 may also be configured to identify prioritized computing devices 104 for connection based on agreement messages received at varying times to live, such as discussed in more detail above.

The processing server 102 may also include a transmitting device 216. The transmitting device 216 may be configured to transmit data over one or more networks via one or more network protocols. The transmitting device 216 may be configured to transmit data to computing devices 104, and other entities via suitable communication networks and corresponding network protocols. In some embodiments, the transmitting device 216 may be comprised of multiple devices, such as different transmitting devices for transmitting data over different networks, such as a first transmitting device for transmitting data over a local area network and a second transmitting device for transmitting data via a blockchain network. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission.

The transmitting device 216 may be configured to electronically transmit data signals that are superimposed or otherwise encoded with request messages to computing devices 104 via a broadcast using a predefined UDP port. The transmitting device 216 may also be configured to electronically transmit data signals to computing devices 104 via a specific TCP port using a communication connection established therewith. In embodiments where the processing server 102 may act as a computing device 104, the transmitting device 216 may also be configured to electronically transmit data signals superimposed or otherwise encoded with agreement messages to other computing devices 104 via the predefined UDP port.

The processing server 102 may also include a memory 218. The memory 218 may be configured to store data for use by the processing server 102 in performing the functions discussed herein. The memory 218 may be configured to store data using suitable data formatting methods and schema and may be any suitable type of memory, such as read-only memory, random access memory, etc. The memory 218 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 218 may be comprised of or may otherwise include a relational database that utilizes structured query language for the storage, identification, modifying, updating, accessing, etc. of structured data sets stored therein.

Process for Automatic Configuration of a Network Communication

Figure 3:
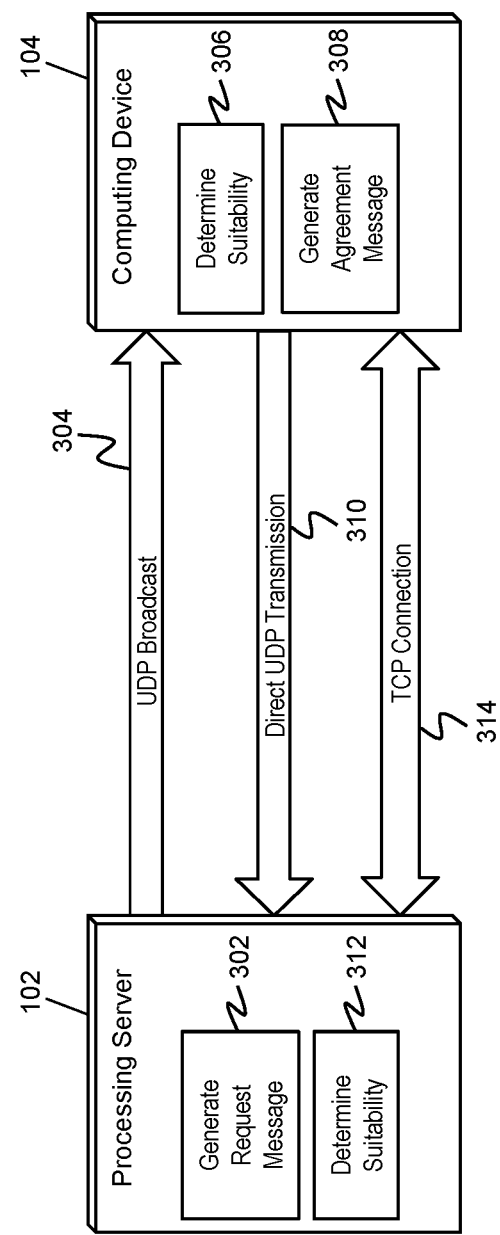
FIG. 3 is a flow diagram illustrating a process for the automatic connection of the processing server of FIG. 2 to a computing device in a communication network using the system of FIG. 1 in accordance with exemplary embodiments.

FIG. 3 illustrates a process 300 for the automatic configuration of a connection by the processing server 102 to a computing device 104 in the communication network illustrated in FIG. 1 via the UDP broadcast of a request message.

In step 302, the generation module 212 of the processing server 102 may generate a request message. The request message may include at least a communication address associated with the processing server 102. In embodiments where the communication network may be a blockchain network, the communication address may be generated by the generation module 212 via one or more predefined algorithms using a public key associated with the processing server 102, such as may be stored in the memory 218 therein. The request message may also include a timestamp, network identifier, blockchain data, one or more available TCP ports, and one or more additional communication addresses. In some instances, the request message may also include one or more service indicators, which may indicate services performed by and/or requested by the processing server 102 in associated with the communication network.

In step 304, the transmitting device 216 of the processing server 102 may electronically broadcast the request message via a predefined UDP port associated with the communication network. The computing device 104 may listen for messages broadcast using that predefined UDP port and may, as a result, receive the request message broadcast from the processing server 102. In step 306, the computing device 104 may determine if the processing server 102 is suitable for a connection. The determination may be based on, for example, the number of connections to the communication network already established by the computing device 104 and the services indicated by the processing server 102. For instance, the computing device 104 may not find the connection suitable if the processing server 102 does not provide a service needed by the computing device 104, or if the processing server 102 requires a service not provided by the computing device 104.

If the computing device 104 determines that it is suitable for the connection, then, in step 308, the computing device 104 may generate an agreement message. The agreement message may include at least a communication address associated with the computing device 104 and one or more TCP ports available for communication with the computing device 104. In instances where the communication network is a blockchain network, the communication address may be a blockchain address derived by the computing device 104 using a public key associated therewith. The agreement message may, in some instances, also include a timestamp, network identifier, blockchain data, and one or more service indicators, which may indicate services performed by and/or requested by the computing device 104. In step 310, the computing device 104 may directly transmit (e.g., not a broadcast transmission) the agreement message to the processing server 102 via the predefined UDP port, to be received by the receiving device 202 thereof.

In step 312, the data identification module 214 of the processing server 102 may determine if the computing device 104 is suitable for connection. The suitability may be based on any suitable criteria, such as the service indicators included in the request message, a geographic location of the computing device 104 (e.g., identified via a location profile 208 queried by the querying module 210 using the communication address), availability of the TCP ports included in the agreement message at the processing server 102, etc. If the computing device 104 is determined to be suitable, then, in step 314, the processing server 102 and computing device 104 may establish a communication connection via one of the TCP ports indicated in the agreement message. In embodiments where the communication network is a blockchain network, future transmissions made using the established TCP communication connection may be signed using private keys in the key pairs associated with the respective entities.

Process for Automatic Configuration of a Partition-Resistant Network

Figure 4:
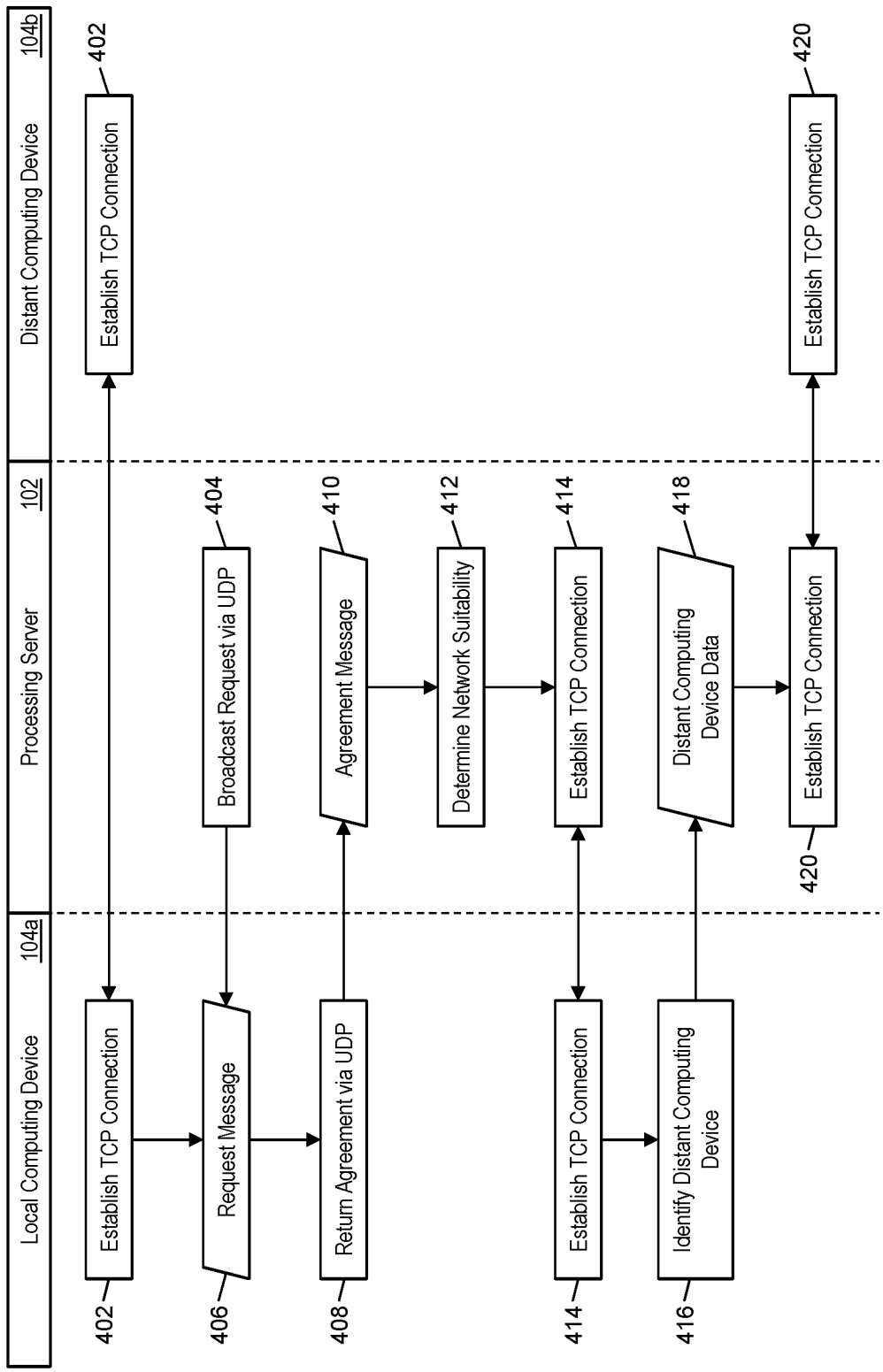
FIG. 4 is a flow diagram illustrating a process for the automatic configuration of a partition-resistant communication network via the use of a distant computing device in the system of FIG. 1 in accordance with exemplary embodiments.

FIG. 4 illustrates a process for the automatic configuration of the partition-resistant network of the system of FIG. 1.

In step 402, a local computing device 104a and a distant computing device 104b, relative to geographic distance from the processing server 102, may establish a TCP communication connection. The TCP communication connection may be established between the local computing device 104 and distant computing device 104b using the processes discussed herein, such as the process 300 illustrated in FIG. 3 and discussed above.

In step 404, the transmitting device 216 of the processing server 102 may broadcast a request message via a predefined UDP port for requesting automatic configuration for connection into the communication network. In step 406, the local computing device 104a may receive the request message, which may include at least a communication address associated with the processing server 102. The local computing device 104a may agree to establish a connection with the processing server 102 in the communication network and may, in step 408, return an agreement message to the processing server 102 via a direct transmission to the communication address from the request message using the predefined UDP port. In step 410, the receiving device 202 of the processing server 102 may receive the agreement message, which may include at least a communication address associated with the receiving device 202 and one or more available TCP ports.

In step 412, the processing server 102 may verify the suitability of the local computing device 104a for the connection to the communication network, such as based on service indicators or other criteria, as discussed in more detail above. In step 414, the processing server 102 and local computing device 104a may establish a communication connection using one of the available TCP ports indicated in the agreement message. In step 416, the local computing device 104a may identify the distant computing device 104b as being of a significant geographic distance from the processing server 102. The identification may be based on, for instance, location profiles 208 for each based on their corresponding communication addresses, provided geographic locations, message timestamps included in communications, communication ping values, etc. The local computing device 104a may provide the communication address, as well as at least one TCP port available at the distant computing device 104b, to the processing server 102, which may be received by the receiving device 202 included therein in step 418.

In step 420, the processing server 102 may establish a direct TCP communication connection with the distant computing device 104b using the data provided by the local computing device 104a. In such an embodiment, the processing server 102 may automatically configure itself as part of the communication network, while also increasing the partition resistance of the network, by having other nodes in the communication network provide connection information of distant nodes. In other embodiments, the distant computing device 104b may be identified directly by the processing server 102, such as based on the use of varying times to live in the broadcast of request messages (e.g., in step 404 of the process illustrated in FIG. 4), such as discussed above.

Process for Automatic Configuration of a Sufficient Number of Connections

Figure 5:
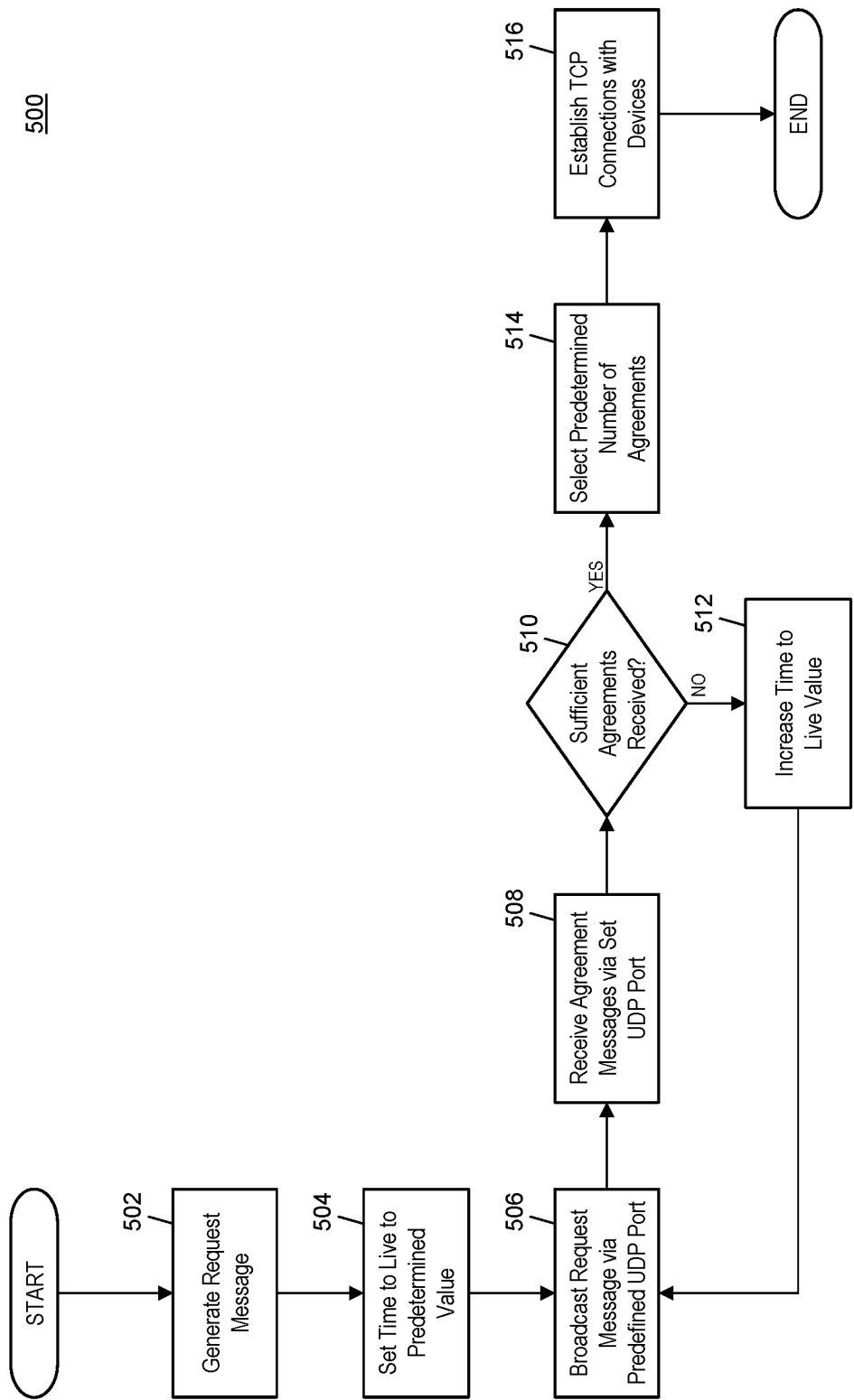
FIG. 5 is a flow diagram illustrating a process for the automatic configuration of a communication network involving the processing server of FIG. 2 in accordance with exemplary embodiments.

FIG. 5 illustrates a process 500 for the automatic configuration of the processing server 102 in the communication network illustrated in FIG. 1, where the processing server 102 establishes a minimum, predetermined number of communication connections as part of the joining of the communication network.

In step 502, the generation module 212 of the processing server 102 may generate a request message. The request message may include at least the communication address associated with the processing server 102. In some embodiments, the communication address may be a blockchain address derived using a public key of a key pair associated with the processing server 102 and a blockchain network. In some cases, the request message may also include at least one of: a network identifier, a timestamp, one or more service indicators, blockchain data, and one or more additional communication addresses. In step 504, the processing server 102 may set a time to live for broadcast messages to a predetermined value. The predetermined value may be based on the communication network to be joined and/or may be stored in the memory 218 of the processing server 102.

In step 506, the transmitting device 216 of the processing server 102 may electronically broadcast the request message via a predefined UDP port. The request message may thus be broadcast to any computing device 104 listening for messages on the predefined UDP port. In step 508, the receiving device 202 of the processing server 102 may receive agreement messages from one or more computing devices 104 that are directly transmitted to the processing server 102 on the predefined UDP port using the communication address included in the request message. Each agreement message may include at least a communication address and one or more available TCP ports, and may also include at least one of: a network identifier, timestamp, one or more service indicators, blockchain data, and one or more additional communication addresses.

In step 510, the data identification module 214 of the processing server 102 may identify if a sufficient number of suitable agreement messages was received. An agreement message may be suitable if the service indicators or other data included in the agreement message matches any criteria set by the processing server 102. The sufficient number may be predetermined number set forth by the settings of the communication network itself, by the processing server 102

(e.g., as stored in the memory 218), or other entity. If the data identification module 214 determines that there are not a sufficient number of agreement messages received, then, in step 512, the time to live value may be increased. Once the time to live is increased, the process 500 may return to step 506, where the request message may be rebroadcast using the higher time to live. Agreement messages may be received again, and, in step 510, the sufficiency thereof re-determined. The processing server 102 may continue to increase the time to live and rebroadcast until the sufficient number of agreement messages have been received.

Once a sufficient number of agreement messages are received, then, in step 514, the data identification module 214 may select the predetermined number of agreement messages. The predetermined number may be the same number used in the determination made in step 510. The data identification module 214 may select agreement messages based on any suitable criteria, such as receipt of an agreement message from the same computing device 104 at a lower time to live, a geographic location of the computing device 104 identified via a location profile 208, the timestamp included in the agreement message, etc. In step 516, the processing server 102 may establish a communication connection with each of the selected computing devices 104 via a TCP port included in the respective agreement message. In embodiments where the communication network is a blockchain network, future communications made using the established communication connection may be signed by the processing server 102 using the private key in the key pair associated with the blockchain network, such as may be stored in the memory 218 of the processing server 102.

Exemplary Method for Automatic Configuration of a Communication Network

Figure 6:
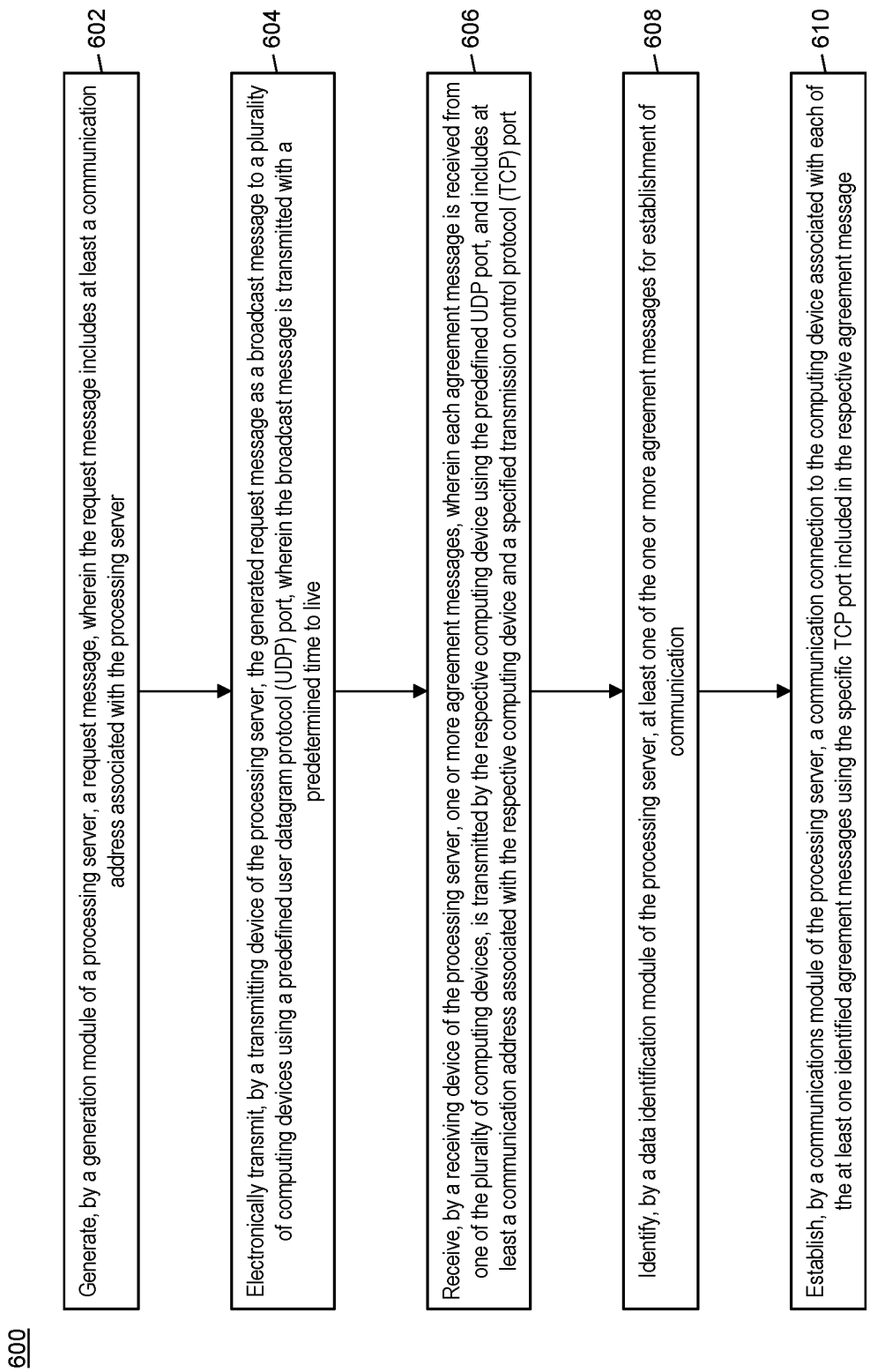
FIG. 6 is a flow chart illustrating an exemplary method for automatic configuration of a communication network in accordance with exemplary embodiments.

FIG. 6 illustrates a method 600 for the automatic configuration of a communication network having a predetermined number of communication connections.

In step 602, a request message may be generated by a generation module (e.g., the generation module 212) of a processing server (e.g., the processing server 102), wherein the request message includes at least a communication address associated with the processing server. In step 604, the generated request message may be electronically transmitted by a transmitting device (e.g., the transmitting device 216) of the processing server as a broadcast message to a plurality of computing devices (e.g., computing devices 104) using a predefined user datagram protocol (UDP) port, wherein the broadcast message is transmitted with a predetermined time to live.

In step 606, one or more agreement messages may be received by a receiving device (e.g., the receiving device 202) of the processing server, wherein each agreement message is received from one of the plurality of computing devices, is transmitted by the respective computing device using the predefined UDP port, and includes at least a communication address associated with the respective computing device and a specified transmission control protocol (TCP) port. In step 608, at least one of the one or more agreement messages may be identified by a data identification module (e.g., the data identification module 214) of the processing server for establishment of communication. In step 610, a communication connection may be established by a communications module (e.g., the communication module 204) of the processing server to the computing device associated with each of the at least one identified agreement messages using the specific TCP port included in the respective agreement message.

In one embodiment, the method 600 further comprises repeating, by the processing server, the transmitting, receiving, identifying, and establishing steps with a second time to live if the identified at least one agreement message does not include at least a predetermined number of agreement messages, where the second time to live is a higher value than the predetermined time to live. In a further embodiment, a combination of the at least one agreement message identified using the predetermined time to live and the at least one agreement message identified using the second time to live may include at least the predetermined number of agreement messages. In another further embodiment, communication connections may not be established for agreement messages received using the predetermined time to live, and the at least one agreement message identified using the second time to live may include at least the predetermined number of agreement messages. In an even further embodiment, identifying the at least one of the one or more agreement messages using the second time to live may include prioritizing agreement messages that include communication addresses corresponding to communication addresses included in the at least one agreement message identified using the predetermined time to live.

In some embodiments, the request message and each of the one or more agreement messages may further include a network identifier associated with a blockchain network. In a further embodiment, the request message may further include a blockchain network address derived using a public key associated with the processing server, and each of the one or more agreement messages may further include a blockchain network address derived using a public key associated with the respective computing device. In an even further embodiment, transmissions made by the processing server using the established communication channel may be signed using the blockchain network address derived using the public key associated with the processing server.

In one embodiment, the request message may further include one or more service indicators, each of the one or more agreement messages may further include at least one service indicator, and the at least one service indicator included in each of the identified at least one agreement messages may correspond to one of the one or more service indicators included in the request message. In some embodiments, the method 600 may also include establishing, by the communications module of the processing server, an additional communication connection to a computing device having a greater geographic distance to the processing server than a geographic distance of the computing device associated with each of the at least one identified agreement messages. In a further embodiment, the computing device having a greater geographic distance to the processing server may be identified by repeating the transmitting, receiving, identifying, and establishing steps with a second time to live, wherein the second time to live is a higher value than the predetermined time to live. In another further embodiment, the method 600 may even further include storing, in a location database (e.g., the location database 206) of the processing server, a plurality of location profiles (e.g., location profiles 208), wherein each location profile includes at least a geographic location and an associated communication address designator, wherein the computing device having a greater geographic distance to the processing server is identified based on the geographic location associated with a communication address designator corresponding to a communication address associated with the computing device.

Figure 7:
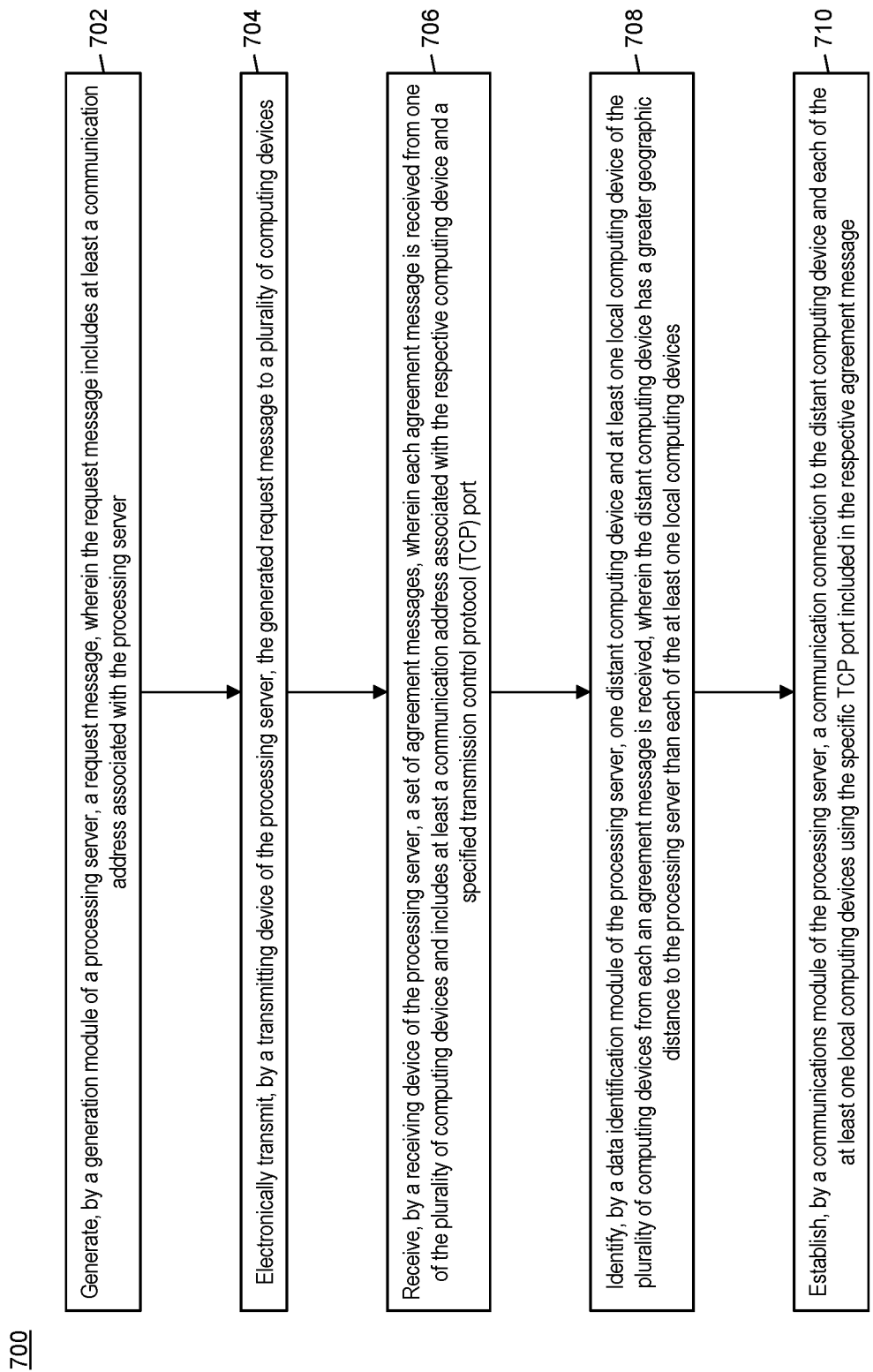
FIG. 7 is a flow chart illustrating an exemplary method for configuration of a partition-resistant communication network in accordance with exemplary embodiments.

Exemplary Method for Configuration of a Partition-Resistant Communication Network FIG. 7 illustrates a method 700 for the configuration of a partition-resistant communication network that utilizes communication connections with multiple computing devices having varying geographic distances from the target computing device.

In step 702, a request message may be generated by a generation module (e.g., the generation module 212) of a processing server (e.g., the processing server 102), wherein the request message includes at least a communication address associated with the processing server. In step 704, the generated request message may be electronically transmitted by a transmitting device (e.g., the transmitting device 216) of the processing server to a plurality of computing devices (e.g., computing devices 104). In step 706, a set of agreement messages may be received by a receiving device (e.g., the receiving device 202) of the processing server, wherein each agreement message is received from one of the plurality of computing devices and includes at least a communication address associated with the respective computing device and a specified transmission control protocol (TCP) port.

In step 708, one distant computing device and at least one local computing device may be identified by a data identification module (e.g., the data identification module 214) of the plurality of computing devices where from each an agreement message is received, wherein the distant computing device has a greater geographic distance to the processing server than each of the at least one local computing devices. In step 710, a communication connection may be established by a communications module (e.g., the communication module 204) of the processing server to the distant computing device and each of the at least one local computing devices using the specific TCP port included in the respective agreement message.

In one embodiment, the method 700 may further include: storing, in a location database (e.g., the location database 206) of the processing server, a plurality of location profiles (e.g., location profiles 208), wherein each location profile includes at least a geographic location and an associated communication address designator; and executing, by a querying module (e.g., the querying module 210) of the processing server, a query on the location database to identify a location profile for the distant computing device and each of the at least one local computing devices where the included communication address designator corresponds to the communication address associated with the respective computing device, wherein the greater geographic distance is based on the geographic location included in each of the identified location profiles and a geographic location of the processing server. In some embodiments, the generated request message may be electronically transmitted as a broadcast message using a predefined user datagram protocol (UDP) port, the broadcast message may be transmitted to the at least one local computing device with a first time to live, the broadcast message may be transmitted to the distant computing device with a second time to live, and the second time to live may have a higher value than the first time to live.

In one embodiment, the request message may further include a blockchain network address derived using a public key associated with the processing server, and each of the one or more agreement messages may further include a blockchain network address derived using a public key associated with the respective computing device. In a further embodiment, transmissions made by the processing server using the established communication channel may be signed using the blockchain network address derived using the public key associated with the processing server.

Computer System Architecture

Figure 8:
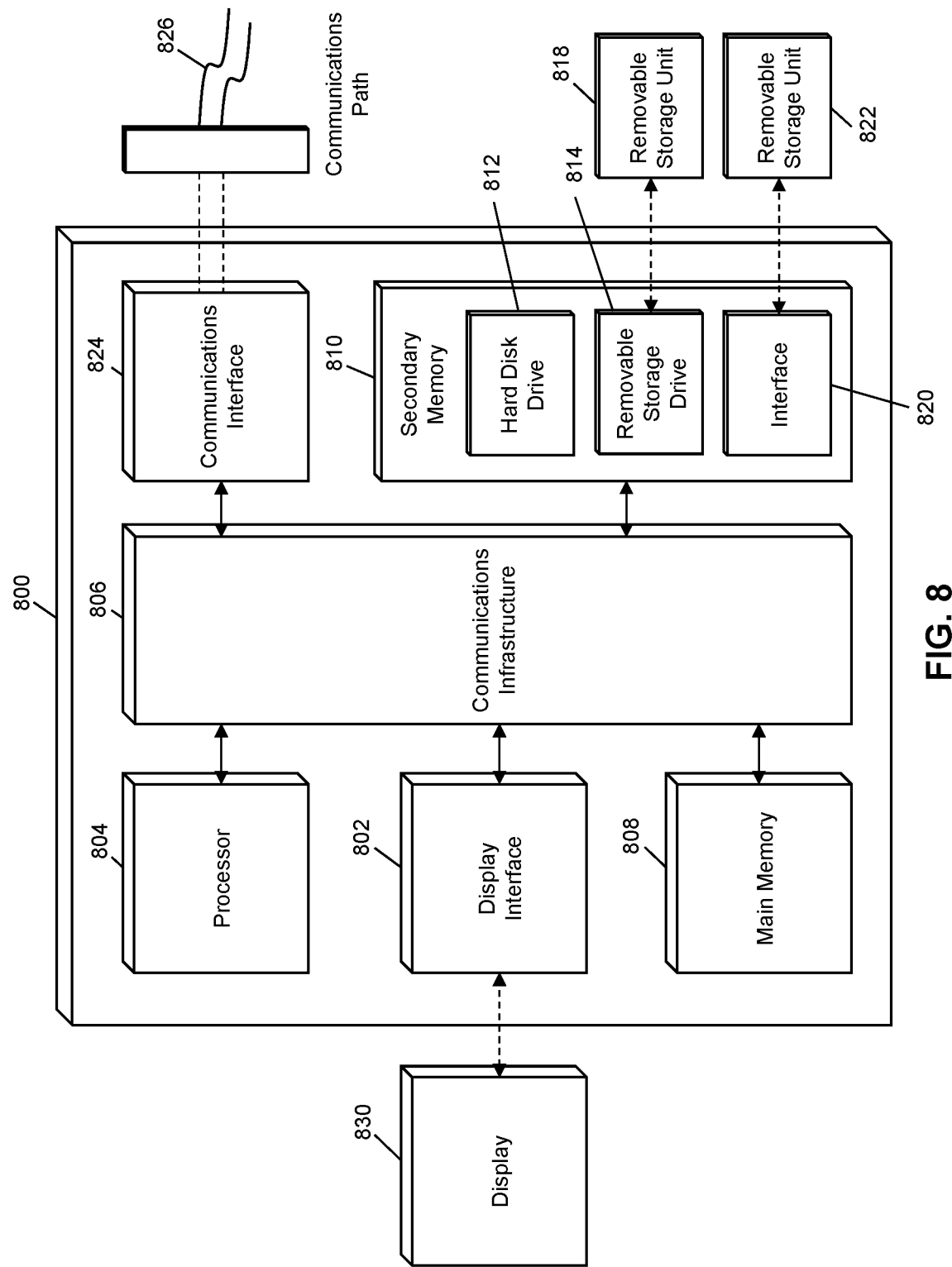
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the processing server 102 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for automatic configuration of a communication network and configuration of a partition-resistant communication network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for configuration of a partition-resistant communication network, comprising:
   electronically transmitting, by a transmitting device of the processing server, a request message to a plurality of computing devices;
   receiving, by a receiving device of the processing server, a set of agreement messages, wherein each agreement message is received from one of the plurality of computing devices and includes at least a communication address associated with the respective computing device and a specified transmission control protocol (TCP) port;

identifying, by a data identification module of the processing server, one distant computing device and at least one local computing device of the plurality of computing devices where from each an agreement message is received, wherein the distant computing device has a greater message transmission distance to the processing server than each of the at least one local computing devices, and a message transmission distance of the distant computing device to the processing server is at least a predetermined distance suitable to resist network partitioning due to physical intervention; and establishing, by a communications module of the processing server, a communication connection to the distant computing device and each of the at least one local computing devices using the specific TCP port included in the respective agreement message, wherein the request message is electronically transmitted as a broadcast message using a predefined user datagram protocol (UDP) port, the broadcast message is transmitted to the at least one local computing device with a first time to live, the broadcast message is transmitted to the distant computing device with a second time to live, and the second time to live has a higher value than the first time to live.

2. The method of claim 1, further comprising:

storing, in a location database of the processing server, a plurality of location profiles, wherein each location profile includes at least a geographic location and an associated communication address designator; and executing, by a querying module of the processing server, a query on the location database to identify a location profile for the distant computing device and each of the at least one local computing devices where the included communication address designator corresponds to the communication address associated with the respective computing device, wherein the greater geographic distance is based on the geographic location included in each of the identified location profiles and a geographic location of the processing server.

3. The method of claim 1, wherein the request message further includes a blockchain network address derived using a public key associated with the processing server, and each of the one or more agreement messages further includes a blockchain network address derived using a public key associated with the respective computing device.

4. The method of claim 3, wherein transmissions made by the processing server using the established communication channel are signed using the blockchain network address derived using the public key associated with the processing server.

5. The method of claim 1, including:

repeating the electronically transmitting, by the transmitting device of the processing server, the request message to the plurality of computing devices a plurality of times, each of the plurality of request messages having a request message time to live, each of the plurality of request message times to live having an increasingly longer time to live;

wherein the set of agreement messages includes an agreement message received in response to each of the plurality of request messages; and wherein identifying the one distant computing device is based on the agreement message received in response to the request message with the longest time to live.

6. A system for configuration of a partition-resistance communication network, comprising:

a processing device of a processing server configured to generate a request message, wherein the request message includes at least a communication address associated with the processing server;

a transmitting device of the processing server configured to electronically transmit the generated request message to a plurality of computing devices;

a receiving device of the processing server configured to receive a set of agreement messages, wherein each agreement message is received from one of the plurality of computing devices and includes at least a communication address associated with the respective computing device and a specified transmission control protocol (TCP) port;

the processing device of the processing server is further configured to:

identify one distant computing device and at least one local computing device of the plurality of computing devices where from each an agreement message is received, wherein the distant computing device has a greater message transmission distance to the processing server than each of the at least one local computing devices, and a message transmission distance of the distant computing device to the processing server is at least a predetermined distance suitable to resist network partitioning due to physical intervention; and establish a communication connection to the distant computing device and each of the at least one local computing devices using the specific TCP port included in the respective agreement message, wherein the generated request message is electronically transmitted as a broadcast message using a predefined user datagram protocol (UDP) port, the broadcast message is transmitted to the at least one local computing device with a first time to live, the broadcast message is transmitted to the distant computing device with a second time to live, and the second time to live has a higher value than the first time to live.

7. The system of claim 6, further comprising:

a location database of the processing server configured to store a plurality of location profiles, wherein each location profile includes at least a geographic location and an associated communication address designator; and the processing device of the processing server configured to execute a query on the location database to identify a location profile for the distant computing device and each of the at least one local computing devices where the included communication address designator corresponds to the communication address associated with the respective computing device, wherein the greater geographic distance is based on the geographic location included in each of the identified location profiles and a geographic location of the processing server.

8. The system of claim 6, wherein the request message further includes a blockchain network address derived using a public key associated with the processing server, and each of the one or more agreement messages further includes a blockchain network address derived using a public key associated with the respective computing device.

9. The system of claim 8, wherein transmissions made by the processing server using the established communication channel are signed using the blockchain network address derived using the public key associated with the processing server.

10. The system of claim 8, including:
repeating the electronically transmitting, by the transmitting device of the processing server, the request message to the plurality of computing devices a plurality of times, each of the plurality of request messages having a request message time to live, each of the plurality of request message times to live having an increasingly longer time to live;
wherein the set of agreement messages includes an agreement message received in response to each of the plurality of request messages; and
wherein identifying the one distant computing device is based on the agreement message received in response to the request message with the longest time to live.

\* \* \* \* \*